United States Patent
Nagahama et al.

(10) Patent No.: US 12,291,625 B2
(45) Date of Patent: May 6, 2025

(54) CELLULOSE NANOCRYSTAL-CONTAINING RESIN COMPOSITION

(71) Applicant: Toyo Seikan Group Holdings, Ltd., Tokyo (JP)

(72) Inventors: Hideaki Nagahama, Yokohama (JP); Yuuki Kinoshita, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 700 days.

(21) Appl. No.: 17/596,456

(22) PCT Filed: Jun. 1, 2020

(86) PCT No.: PCT/JP2020/021634
§ 371 (c)(1),
(2) Date: Dec. 10, 2021

(87) PCT Pub. No.: WO2020/250738
PCT Pub. Date: Dec. 17, 2020

(65) Prior Publication Data
US 2022/0306840 A1  Sep. 29, 2022

(30) Foreign Application Priority Data

Jun. 13, 2019 (JP) .................. 2019-110607

(51) Int. Cl.
*C08L 1/02* (2006.01)
*C08L 67/00* (2006.01)
*C08L 77/00* (2006.01)
*C08L 79/08* (2006.01)

(52) U.S. Cl.
CPC .............. *C08L 1/02* (2013.01); *C08L 67/00* (2013.01); *C08L 77/00* (2013.01); *C08L 79/08* (2013.01)

(58) Field of Classification Search
CPC .............. C08L 1/02; C08L 77/02; C08L 1/04
See application file for complete search history.

(56) References Cited

U.S. PATENT DOCUMENTS

| | | |
|---|---|---|
| 2012/0244357 A1 | 9/2012 | Leung et al. |
| 2015/0298346 A1 | 10/2015 | Borowka et al. |
| 2021/0198455 A1 | 7/2021 | Miyoshi et al. |

FOREIGN PATENT DOCUMENTS

| | | | |
|---|---|---|---|
| CA | 3 036 493 A1 | 3/2017 | |
| CN | 102947345 A | 2/2013 | |
| CN | 103396571 A | 11/2013 | |
| CN | 105419012 A | 3/2016 | |
| CN | 105524349 A | * 4/2016 | ............ C08L 23/12 |
| JP | 2015-101694 A | 6/2015 | |
| JP | 2015-533353 A | 11/2015 | |
| JP | 2016-222745 A | 12/2016 | |
| JP | 6293769 B2 | 3/2018 | |
| JP | 2019-014864 A | 1/2019 | |
| JP | 2019-203108 A | 11/2019 | |

OTHER PUBLICATIONS

English Machine Translation of CN105524349 A https://worldwide.espacenet.com/publicationDetails/biblio?CC=CN&NR=105524349A&KC=A&FT=D&ND=3&date=20160427&DB=EPODOC&locale=en_EP (Year: 2016).*
Office Action issued May 27, 2023 in corresponding Chinese Patent Application No. 202080042677.5.
Li Jian, "Modification of Bacterial Cellulose Nanofibrous Tissue Engineering Scaffolds and its Composites," China Doctoral Dissertations Full Database Medical and Health Science and Technology Series, No. 12, Dec. 15, 2010, pp. E080-E089 (9 pages).
International Search Report for PCT/JP2020/021634 dated Aug. 18, 2020 (PCT/ISA/210).
Eduardo Robles, et al., "Surface-modified nano-cellulose as reinforcement in poly(lactic acid) to conform new composites", Industrial Crops and Products, 2015, vol. 71, 44-53 (10 pages).
Office Action issued Aug. 14, 2023 in corresponding Canadian Application No. 3,143,144.
Communication dated Nov. 3, 2022, issued in Chinese Application No. 202080042677.5.
Preparation of Morus Nanocellulose Whiskers and Application Research Thereof, Levingie, Chinese Thesis Full Database Engineering Technology 1, p. B020-129, Jun. 15, 2011 (3 pages total).
Extended European Search Report dated Feb. 28, 2023 in corresponding European Application No. 20823133.2.
Pandey et al., "Bio-nano reinforcement of environmentally degradable polymer matrix by cellulose whiskers from grass", Elsevier, 2009, vol. 40, No. 7, pp. 676-680 (5 pages total).
Cesar et al., "Cellulose nanocrystals from natural fiber of the macrophyte *Typha domingensis*: extraction and characterization", Cellulose, 2015, vol. 22, No. 1, pp. 449-460 (12 pages total).
Prado et al., "Isolation and characterization of cellulose nanocrystals from pineapple crown waste and their potential uses", International Journal of Biological Macromolecules, 2018, vol. 122, pp. 410-416 (7 pages total).

* cited by examiner

*Primary Examiner* — Ling Siu Choi
*Assistant Examiner* — Olga Lucia Donahue
(74) *Attorney, Agent, or Firm* — Sughrue Mion, PLLC

(57) ABSTRACT

The present invention relates to a cellulose-containing resin composition and a method of producing the same. The cellulose-containing resin composition includes cellulose nanocrystals containing, as cellulose, hemicellulose in an amount of 10 wt. % or less, and thereby the amount of VOCs released due to the cellulose can be reduced without using an additive, and a cellulose-containing resin composition having a lower TVOC amount than that of the resin itself can be provided.

6 Claims, No Drawings

CELLULOSE NANOCRYSTAL-CONTAINING RESIN COMPOSITION

CROSS REFERENCE TO RELATED APPLICATIONS

This application is a National Stage of International Application No. PCT/JP2020/021634 filed Jun. 1, 2020, claiming priority based on Japanese Patent Application No. 2019-110607 filed Jun. 13, 2019.

TECHNICAL FIELD

The present invention relates to a cellulose nanocrystal-containing resin composition, and more specifically, relates to a resin composition containing cellulose nanocrystals with a reduced amount of total volatile organic components.

BACKGROUND ART

The use of nanocellulose as a high-grade biomass raw material, an example of which includes a functional additive, a film composite material, or the like, has been proposed in various applications. In particular, with cellulose nanofibers in which cellulose fibers have been made finer through a mechanical process, and hydrophilic functional groups such as carboxyl groups and phosphate groups have been introduced through substitution of the hydroxyl groups of the cellulose using a chemical process, the energy required to make the fibers finer is reduced, and the cellulose nanofibers are provided with functional groups that have an affinity to resin, and therefore dispersibility in the resin is excellent. Furthermore, because dispersibility in an aqueous solvent and transparency of the dispersion are improved, using the nanocellulose in various applications has been attempted (Patent Document 1, etc.).

Composite materials having cellulose contained in a resin exhibit excellent mechanical strength while being lightweight, and therefore have been widely used in applications such as automotive interior and exterior materials and building materials.

However, such composite materials contain volatile organic compounds (VOCs) attributed to wood materials. The VOCs are generated not only during the production process of the composite materials, but also when the composite materials are in use, and therefore there is a need to suppress the generation of the VOCs.

In order to solve this issue, various technologies that involve blending a VOC-adsorbing additive into a composite material containing cellulose in a resin have been proposed. For example, the following Patent Document 2 proposes the use of activated carbon as an additive, and indicates that the use of such an additive has an effect of reducing the VOCs generated from wood materials to be released.

CITATION LIST

Patent Literature

Patent Document 1: JP 2015-101694 A
Patent Document 2: JP 6293769 B

SUMMARY OF INVENTION

Technical Problem

However, with composite materials that use additives such as activated carbon to adsorb VOCs and reduce the amount of VOCs that are released, when a large amount of the additive is blended to reduce the amount of VOCs that are released, the moldability and physical properties of the composite material may be impaired. On the other hand, when the amount of the additive is adjusted so as not to impair the moldability or physical properties, it becomes difficult to sufficiently reduce the amount of VOCs that are released.

Therefore, an object of the present invention is to provide a cellulose-containing resin composition capable of reducing the amount of VOCs released due to the presence of cellulose without using an additive, and to also provide a method of producing the same.

Solution to Problem

According to the present invention, a cellulose nanocrystal-containing resin composition characterized by including a resin, the resin containing cellulose nanocrystals having a hemicellulose content of 10 wt. % or less, is provided.

In the cellulose nanocrystal-containing resin composition according to the present invention, preferably:
1. the amount of total volatile organic components (measured in accordance with JASO M 902:2011) is smaller than the amount of total volatile organic components in the resin alone;
2. the cellulose nanocrystals contain a sulfate group and/or a sulfo group originated from a sulfuric acid treatment in an amount from 0.01 to 4.0 mmol/g;
3. the cellulose nanocrystals has a fiber width of 50 nm or smaller, a fiber length of 500 nm or smaller, and a crystallinity of 60% or greater;
4. the cellulose nanocrystals is included in an amount from 0.1 to 50 parts by weight relative to 100 parts by weight of the resin; and
5. the resin is a thermoplastic resin.

According to the present invention, a method of producing a cellulose nanocrystal-containing resin composition including adding cellulose nanocrystals having a hemicellulose content of 10 wt. % or less to a resin, and mixing the resin with the cellulose nanocrystal is provided.

Advantageous Effects of Invention

In the cellulose nanocrystal-containing resin composition of the present invention, in a case where cellulose nanocrystals containing a large amount of crystal portions having high heat resistance are used as cellulose, and amorphous portions having low heat resistance contained in these cellulose nanocrystals are reduced, the heat resistance of the cellulose components in the resin composition can be improved, and thereby thermal decomposition of the cellulose nanocrystals upon mixing with the resin can be effectively suppressed. As a result, the release of VOCs from the cellulose can be suppressed, and the cellulose nanocrystals can adsorb the VOCs released through the thermal decomposition of the resin, and thus the amount of total volatile organic components (TVOCs) of the resin composition can be reduced to an extent that is smaller than the TVOCs in the resin alone.

That is, in the cellulose nanocrystal-containing resin composition, hemicellulose in the cellulose nanocrystals easily undergoes thermal decomposition and becomes a factor for the release of VOCs such as aromatic aldehydes, whereas the functional groups of the cellulose nanocrystals become adsorption factors that can adsorb the released VOCs. Hemicellulose contributes to the release of VOCs through thermal decomposition, but in the present invention, the hemicellulose in the cellulose nanocrystals is reduced, and therefore the adsorption factors of cellulose nanocrystals become dominant, and the cellulose nanocrystals can adsorb the VOCs that are released due to thermal decomposition of the resin. As a result, an effect of reducing the TVOCs of the resin composition to an extent that is less than the TVOCs in the resin alone is achieved.

In addition, the cellulose nanocrystals used as a raw material have sulfate groups and/or sulfo groups as a result of a sulfuric acid treatment, and the sulfate groups and/or the sulfo groups become a factor for VOC adsorption. Moreover, the cellulose nanocrystals have a short fiber length, and therefore in comparison to a case in which cellulose nanofibers having a long fiber length are used, the cellulose nanocrystals are less prone to the generation of heat due to shearing when the cellulose nanocrystals are kneaded with the resin, and thermal decomposition can be suppressed.

Furthermore, cellulose nanocrystals having sulfate groups and/or sulfo groups can form fine, dense self-assembled structures, and can impart excellent properties to the resin composition including a thickening property, specific surface area, strength, rigidity, heat resistance, and gas barrier properties. Furthermore, cellulose nanocrystals having sulfate groups and/or sulfo groups can also support metal particulates.

DESCRIPTION OF EMBODIMENTS

Cellulose Nanocrystal-Containing Resin Composition

In the cellulose nanocrystal-containing resin composition of the present invention, it is an important feature that the cellulose nanocrystals contained therein have a hemicellulose content of 10 wt. % or less.

Plant-derived materials used as high-grade biomass raw materials such as wood pulp in particular contain primarily cellulose, hemicellulose, and lignin, and the content of each component varies depending on the plant species of the raw material. Generally, cellulose is contained in an amount from 40 to 50%, and hemicellulose and lignin are contained approximately in an amount from 15 to 35%.

Cellulose nanocrystals are formed by treatment of such plant-derived materials and particularly wood pulp with a strong acid such as sulfuric acid or hydrochloric acid. Because the crystallinity is high and heat resistance is excellent, the generation of VOCs due to heating from the cellulose nanocrystals themselves is relatively low. Furthermore, the cellulose nanocrystals used are the ones that are obtained by a sulfuric acid treatment, and sulfate groups and/or a sulfo groups capable of adsorbing VOCs are introduced in such cellulose nanocrystals. Thus, the cellulose nanocrystals can absorb the VOCs produced by thermal decomposition or the like of the resin.

In the present invention, the content of hemicellulose, which is amorphous and exhibits inferior heat resistance, in the cellulose nanocrystals having the features described above is reduced to 10 wt. % or less, and by using such cellulose nanocrystals, the generation of VOCs from the cellulose nanocrystals can be significantly reduced even when compounded with a resin and kneaded under heating.

As a result, in the cellulose nanocrystal-containing resin composition of the present invention, as described above, of the thermal decomposition of the resin and the thermal decomposition of the cellulose crystals, which are the main factors for the release of VOCs, the VOC generation due to the thermal decomposition of the cellulose nanocrystals is reduced, and the adsorption of VOCs due to the presence of sulfate groups and/or sulfo groups of the cellulose nanocrystals, which are a factor for adsorption of VOCs, is improved. Therefore, the amount of total volatile organic components (measured in accordance with JASO M 902: 2011) can be further reduced to the extent that it is less than the amount of total volatile organic components in the resin alone.

[Cellulose Nanocrystals]

In the present invention, all cellulose nanocrystals for which the plant-derived materials and particularly wood pulp have been treated with a strong acid such as sulfuric acid or hydrochloric acid can be used, but as described above, it is preferable to use cellulose nanocrystals that have been subjected to a sulfuric acid treatment so as to contain particularly sulfate groups and/or sulfo groups. Furthermore, VOC adsorption is made possible as the content of the sulfate groups and/or sulfo groups increases, but excess functional groups not participating in adsorption could become a factor for the release of VOCs. Therefore, the content of the sulfate groups and/or sulfo groups is preferably from 0.01 to 4.0 mmol/g, and particularly preferably from 0.01 to 0.2 mmol/g. Note that in the present specification, a sulfate group is a term that includes a sulfate ester group.

It is desirable for the cellulose nanocrystals to have a fiber width of 50 nm or smaller and a fiber length of 500 nm or smaller, and by setting the fiber width and fiber length to such ranges, the generation of heat through shearing when the cellulose nanocrystals are kneaded into the resin does not occur, and the generation of VOCs from the cellulose nanocrystals is suppressed. In addition, the short fiber length of the cellulose nanocrystals results in various merits. For example, with a short fiber length, the fibers of the cellulose nanocrystals are more easily separated than the cellulose nanofibers, and the cellulose nanocrystals are easily and uniformly dispersed in a molten resin.

Furthermore, the crystallinity of the cellulose nanocrystals is preferably at least 60%. Such a high crystallinity can improve heat resistance and deter thermal decomposition, and therefore the generation of VOCs is suppressed.

Note that the cellulose nanocrystals used in the present invention do not exclude using a known hydrophilizing treatment such as a TEMPO treatment depending on the amount of anionic functional groups imparted to the cellulose nanocrystals. But when the amount of functional groups increases due to the hydrophilizing treatment, the heat resistance of the cellulose nanocrystals is reduced, and factors for the release of VOCs of the cellulose nanocrystals are increased. Therefore, in order to further reduce the TVOC amount, it is desirable to use cellulose nanocrystals that have not been subjected to a hydrophilizing treatment.

As described above, setting the content of hemicellulose in the cellulose nanocrystals used in the present invention to 10 wt. % or less is an important feature.

As a method for reducing the hemicellulose content of the cellulose nanocrystals, the content can be reduced by a method of performing an alkali wash using an aqueous solution of an alkaline compound such as sodium hydroxide or potassium hydroxide and also an acid wash using an inorganic acid such as hydrochloric acid and sulfuric acid, followed by further washing the cellulose nanocrystals, or by a method of carrying out hydrolysis in hot water using an autoclave or the like.

The specific method for measuring the amount of hemicellulose in the cellulose nanocrystals will be described below in the examples, but the method thereof involves removing lignin from the cellulose nanocrystals in accordance with the WISE method (lignin removal through a method using chlorous acid), quantitatively determining the holocellulose (α-cellulose and hemicellulose), and then filtering out the hemicellulose through an alkaline treatment of the obtained holocellulose, and quantitatively determining the amount of hemicellulose.

The content of the cellulose nanocrystals cannot be unconditionally defined and such a definition may differ depending on the application of the resin composition, the type of resin that is used, and the like. However, the content of the cellulose nanocrystals relative to 100 parts by weight of the resin is preferably from 0.1 to 50 parts by weight, and particularly preferably from 1 to 10 parts by weight. When the amount of the cellulose nanocrystals is less than the aforementioned ranges, the effects from compounding the cellulose nanocrystals cannot be sufficiently obtained, whereas when the amount of cellulose nanocrystals is greater than the aforementioned ranges, moldability, strength, and the like may be impaired.

[Resin]

As the resin that serves as the matrix of the cellulose nanocrystal-containing resin composition of the present invention, a known synthetic resin such as a thermoplastic resin, a thermosetting resin, or a photocurable resin can be used according to the application. However, with the cellulose nanocrystals used in the present invention, the factors for adsorption of VOCs become dominant even in a case in which the cellulose nanocrystals are melt-kneaded, and therefore, the cellulose nanocrystals can be suitably used in a thermoplastic resin that requires melt-kneading when molding.

Examples of thermoplastic resins include olefin copolymers, such as low-, medium-, and high-density polyethylenes, linear low-density polyethylene, linear ultra low-density polyethylene, isotactic polypropylene, syndiotactic polypropylene, propylene-ethylene copolymers, polybutene-1, ethylene-butene-1 copolymers, propylene-butene-1 copolymers, ethylene-propylene-butene-1 copolymers, and ethylene-vinyl alcohol copolymers; polyester resins, such as polyethylene terephthalate, polybutylene terephthalate, polyethylene naphthalate, polylactic acid, polybutylene succinate, polyhydroxyalkanoic acid, and polycaprolactone; polyamide resins, such as nylon 6, nylon 6,6, and nylon 6,10; polycarbonate resins; cellulose-based resins, such as acetyl cellulose, cellulose acetylpropionate, and cellulose acetate butyrate; resins having a hydroxyl group and/or a carboxyl group, such as polyvinyl alcohol and polyacrylate; natural polymer-based resins, such as starch, chitin, chitosan, gelatin, proteins, and casein; and super-engineering plastics, such as liquid crystal polymers, polytetrafluoroethylene, amorphous polyarylates, polyetheretherketones, polyphenylene sulfide, fluororesins, polysulfone, polyether sulfone, thermoplastic polyimide, and polyamide-imide. In order to reduce TVOCs, a thermoplastic resin having high heat resistance is preferably used, and in particular, polyester resins, polyamide resins, polyamide-imide resins, and the like can be suitably used.

Examples of thermosetting resins include natural polymeric resins such as phenol resins, epoxy resins, urethane resins, melamine resins, urea resins, alkyd resins, unsaturated polyester resins, silicone resins, thermosetting polyamides, lacquers, and lignins, and examples of photocurable resins include photocurable acrylic resins.

Resin additives known in a related art, such as fillers, antioxidants, ultraviolet absorbers, flame retardants, antistatic agents, lubricants, stabilizers, and adsorbents can be blended into the resin within a range that does not impair the properties of the resin composition of the present invention.

(Method of Producing the Cellulose Nanocrystal-Containing Resin Composition)

The cellulose nanocrystal-containing resin composition of the present invention can be prepared by adding and mixing cellulose nanocrystals having a hemicellulose content of 10 wt. % or less into the resin.

As described above, cellulose nanocrystals obtained by treating cellulose with a strong acid such as sulfuric acid are subjected to an alkali treatment using an alkaline agent, and then acid washed and neutralized, after which the washed and neutralized cellulose nanocrystals are subjected to a filtration treatment using a dialysis membrane or the like to remove impurities and the like, and thereby cellulose nanocrystals having a hemicellulose content adjusted to 10 wt. % or less are obtained.

In a dried state with the moisture removed, the cellulose nanocrystals for which the hemicellulose content has been adjusted can also be mixed with the resin through either dry blending or melt blending. When the cellulose nanocrystals are mixed through melt blending, a cellulose nanocrystal dispersion in which a protic polar solvent is used as the dispersing medium can also be used.

The cellulose nanocrystal dispersion in which a protic polar solvent is used as the dispersing medium can be prepared by the following method.

A cellulose nanocrystal aqueous dispersion in which the hemicellulose content has been adjusted to 10 wt. % or less is prepared, after which the cellulose nanocrystal aqueous dispersion is subjected to solvent-substitution with an alcohol-based solvent such as methanol, ethanol, propanol, or butanol, or a protic polar solvent such as formic acid, and nitromethane, and thereby the cellulose nanocrystal dispersion with a protic polar solvent can be prepared. Since the dispersion thereof has affinity even for hydrophobic resins, the dispersion can also be used as a diluent or the like for the resin, and the cellulose nanocrystals can be efficiently and uniformly dispersed in the resin. Note that, if necessary, the cellulose nanocrystal dispersion can be subjected to a defibration treatment and a dispersion treatment.

The defibration treatment can be performed by a method known in a related art, and specifically, the fibers can be made finer using an ultra-high pressure homogenizer, an ultrasonic homogenizer, a grinder, a high-speed blender, a bead mill, a ball mill, a jet mill, a disintegrator, a beating machine, a twin screw extruder, or the like.

The defibration treatment can be performed through either a dry process or a wet process according to the state and application of the cellulose nanocrystals. When the cellulose nanocrystals are used in the state of a dispersion, it is preferable to perform defibrillation using an ultra-high pressure homogenizer with a polar solvent such as water used as the dispersion medium.

In the dispersion treatment, a disperser such as an ultrasonic disperser, a homogenizer, or a mixer can be suitably used, and a stirring method using a stir rod, a stirring stone, or the like may also be used.

The method of solvent substitution from the aqueous dispersion to the protic polar solvent can be performed by mixing the cellulose nanocrystal aqueous dispersion with a protic polar solvent after removing or while removing the water content of the aqueous dispersion through a dehydration method such as filtration using a filter or a centrifuge. After the solvent substitution treatment, a cellulose nanocrystal dispersion is prepared by dispersing the nanocellulose in a protic polar solvent by a method similar to that of the above dispersion treatment.

The cellulose nanocrystal dispersion obtained in this manner has affinity for hydrophobic resins, and therefore can be efficiently kneaded in a thermoplastic resin in a molten state, and a resin composition in which cellulose nanocrystals are uniformly dispersed can be provided.

EXAMPLES

Examples of the present invention are described below. Note that the following examples are merely examples of the present invention, and the present invention is not limited to these examples. The methods for preparing and measuring each item are as follows.

<Sulfate Group and/or Sulfo Group Amount>

Cellulose nanocrystals were weighed, and ion-exchanged water was added to prepare 100 ml of a 0.05 to 0.3 mass % cellulose nanocrystal dispersion. Next, 0.1 g of a cation-exchange resin was added and stirred. Subsequently, filtration was performed to separate the cation-exchange resin and the cellulose nanocrystal dispersion. A potentiometric automatic titrator (available from Kyoto Electronic Manufacturing Co., Ltd.) was used to perform dropwise addition of a 0.05 M sodium hydroxide solution to the dispersion after cation exchange, and the change in electrical conductivity exhibited by the cellulose nanocrystal dispersion was measured. The titration amount of the sodium hydroxide consumed to neutralize the amount of sulfate groups and/or the sulfo groups was determined from the obtained conductivity curve, and the following equation (1) was used to calculate the amount (mmol/g) of sulfate groups and/or sulfo groups.

[Amount (mmol/g) of sulfate groups and/or sulfo groups]=[titration amount (ml) of sodium hydroxide consumed for neutralization of anionic functional groups]×[sodium hydroxide concentration (mmol/ml)]÷[solid mass (g) of cellulose nanocrystals]    (1)

<Lignin Removal Through the WISE Method>

10 g of cellulose nanocrystals was placed in a 1200 ml Erlenmeyer flask, 600 ml of distilled water, 4.0 g of sodium hypochlorite, and 0.8 ml of acetic acid were added, and the Erlenmeyer flask was loosely capped and heated for 1 hour over a 70 to 80° C. hot water bath while occasionally shaking the mixture gently. Without cooling the mixture, 4.0 g of sodium hypochlorite and 0.8 ml of acetic acid 0.8 ml were added, and the mixture was heated. This operation was repeated four times, after which the mixture was placed into a weighing bottle, suction filtered using a glass filter for which the constant weight had been determined, and then washed with cold water and acetone, after which the mixture was dried in a dryer at 105° C., and then cooled in a desiccator, and thereby holocellulose having lignin removed from the cellulose nanocrystals was obtained along with the weight thereof <Calculation of the Amount of Hemicellulose>

The above holocellulose was placed in a 500 ml beaker, 100 ml of a 17.5% sodium hydroxide aqueous solution was added, and the mixture was left to stand at 20° C. for 3 minutes, after which the holocellulose was crushed with a glass rod for 5 minutes, dispersed uniformly, and the mixture was left standing at 20° C. for 30 minutes. After 30 minutes, 100 ml of 20° C. water was added, the mixture was stirred for 1 minute, and then left to stand for 5 minutes, after which the mixture was placed in a weighing bottle, suction filtered using a glass filter for which the constant weight had been determined, and then washed with 20° C. water while pressing with a glass rod. An additional 200 ml of 10% acetic acid was poured into the filtered mixture, after which the mixture was suction filtered to remove the liquid as much as possible, washed with 1 L of boiling water and then dried in a 105° C. dryer, and the hemicellulose was filtered from the holocellulose by the treatment described above. The material was cooled in a desiccator and then weighed, and the weight (%) of the hemicellulose contained in the cellulose nanocrystals was calculated.

Example 1

<Preparation of Cellulose Nanocrystal-Containing Resin Composition>

Polypropylene resin (MA04, available from Japanese Polypropylene Corporation) was melt-kneaded using a twin screw granulator equipped extruder (TEM-35B: available from Toshiba Machine Co., Ltd.) having a barrel temperature setting of 200° C., and cellulose nanocrystals having a hemicellulose content of 10 wt. % were quantitatively charged into the melt-kneaded polypropylene resin such that the blending ratio of the cellulose nanocrystals to the polypropylene resin was 4 wt. %, and the mixture was melt-kneaded at a rotational speed of 100 rpm, and thereby a cellulose nanocrystal-containing resin was obtained. The cellulose nanocrystal-containing resin was heated and subjected to a drying treatment for 5 hours at 80° C., and then injection molded using the injection molding machine NN75JS (available from Niigata Engineering Co., Ltd.) at conditions including a mold temperature of 20° C. and a cylinder temperature of 200° C., and an injection-molded plate (flat plate: 100×100 mm, thickness: 1 mm) made of the cellulose nanocrystal-containing resin composition was obtained.

<TVOC Amount>

For the injection-molded plate made of the cellulose nanocrystal-containing resin composition, the VOC components were dissipated, collected, and concentrated by the sampling bag test method in accordance with the JASO M 902:2011 VOC (volatile organic compound) measurement standard, the VOC components were quantitatively determined, and the TVOC amount was determined. The procedure is indicated below.

The injection-molded plate of the above-described cellulose nanocrystal-containing resin composition was placed into a collection bag (10 L) having an inner surface coated with Teflon (trade name), and sealed, after which the air inside the bag was purged with 5 L of nitrogen. The bag was then placed into a dryer heated to 65° C., and after two hours, the air inside the bag was collected. Each VOC component in the collected air was quantitatively determined using gas chromatograph mass spectrometry (HP6890 type gas chromatograph and HP 5973 type mass-selective detector available from Agilent Technologies; TDSA/CIS4 System available from Gerstel; column: HP-5MS available from Agilent Technologies; column temperature: from 40° C. to 280° C.; measurement mode: SCAN measurements; mass range: from 25 to 550) and a liquid chromatograph (1200 series available from Agilent Technologies; detector: UV/VIS; measurement wavelength: 360 nm). The amount of TVOCs was quantified by creating a calibration curve using toluene of a known concentration.

Example 2

A cellulose nanocrystal-containing resin was obtained in the same manner as Example 1 with the exception that a nylon 6 resin (A1020BRL available from Unitika Ltd.) was melt-kneaded using a twin screw granulator equipped extruder (TEM-35B: available from Toshiba Machine Co., Ltd.) having a barrel temperature setting of 240° C., and cellulose nanocrystals having a hemicellulose content of 10 wt. % were quantitatively charged into the melt-kneaded nylon 6 resin such that the blending ratio of the cellulose nanocrystals to the nylon 6 resin became 10 wt. %. The cellulose nanocrystal-containing resin was heated and subjected to a drying treatment for 24 hours at 80° C., and then injection molded using the injection molding machine NN75JS (available from Niigata Engineering Co., Ltd.) at conditions including a mold temperature of 80° C. and a cylinder temperature of 240° C., and an injection-molded plate (flat plate: 100×100 mm, thickness: 1 mm) made of the cellulose nanocrystal-containing resin composition was obtained.

The TVOC amount of the injection-molded plate made from the aforementioned cellulose nanocrystal-containing resin composition was determined in the same manner as in Example 1.

Comparative Example 1

A polypropylene resin (MA04, available from Japanese Polypropylene Corporation) was melt-kneaded using a twin screw granulator equipped extruder (TEM-35B: available from Toshiba Machine Co., Ltd.) having a barrel temperature setting of 200° C., and a polypropylene resin was obtained by melt-kneading at a rotational speed of 100 rpm. The polypropylene resin was heated and subjected to a drying treatment for 5 hours at 80° C., and then injection molded using the injection molding machine NN75JS (available from Niigata Engineering Co., Ltd.) at conditions including a mold temperature of 20° C. and a cylinder temperature of 200° C., and an injection-molded plate (flat plate: 100×100 mm, thickness: 1 mm) made of the polypropylene resin was obtained.

The TVOC amount of the injection-molded plate made from the polypropylene resin was determined in the same manner as in Example 1.

Comparative Example 2

A nylon 6 resin (A1020BRL available from Unitika Ltd.) was melt-kneaded using a twin screw granulator equipped extruder (TEM-35B: available from Toshiba Machine Co., Ltd.) having a barrel temperature setting of 240° C., and a nylon 6 resin was obtained. The nylon 6 resin was heated and subjected to a drying treatment for 24 hours at 80° C., and then injection molded using the injection molding machine NN75JS (available from Niigata Engineering Co., Ltd.) at conditions including a mold temperature of 80° C. and a cylinder temperature of 240° C., and an injection-molded plate (flat plate: 100×100 mm, thickness: 1 mm) made of the nylon 6 resin was obtained.

The TVOC amount of the injection-molded plate made from the nylon 6 resin was determined in the same manner as in Example 1.

Comparative Example 3

A polypropylene resin (MA04, available from Japanese Polypropylene Corporation) was melt-kneaded using a twin screw granulator equipped extruder (TEM-35B: available from Toshiba Machine Co., Ltd.) having a barrel temperature setting of 200° C., and cellulose nanocrystals having a hemicellulose content of 18.3 wt. % were quantitatively charged into the melt-kneaded polypropylene resin such that the blending ratio of the cellulose nanocrystals to the polypropylene resin became 4 wt. %, and the mixture was melt-kneaded at a rotational speed of 100 rpm, and thereby a cellulose nanocrystal-containing resin was obtained. The cellulose nanocrystal-containing resin was heated and subjected to a drying treatment for 5 hours at 80° C., and then injection molded using the injection molding machine NN75JS (available from Niigata Engineering Co., Ltd.) at conditions including a mold temperature of 20° C. and a cylinder temperature of 200° C., and an injection-molded plate (flat plate: 100×100 mm, thickness: 1 mm) made of the cellulose nanocrystal-containing resin composition was obtained.

The TVOC amount of the injection-molded plate made from the aforementioned cellulose nanocrystal-containing resin composition was determined in the same manner as in Example 1.

Comparative Example 4

A nylon 6 resin (A1020BRL available from Unitika Ltd.) was melt-kneaded using a twin screw granulator equipped extruder (TEM-35B: available from Toshiba Machine Co., Ltd.) having a barrel temperature setting of 240° C., and cellulose nanocrystals having a hemicellulose content of 18.3 wt. % were quantitatively charged into the melt-kneaded nylon 6 resin such that the blending ratio of the cellulose nanocrystals to the nylon 6 resin became 10 wt. %, and the mixture was melt-kneaded at a rotational speed of 100 rpm, and thereby a cellulose nanocrystal-containing resin was obtained. The cellulose nanocrystal-containing resin was heated and subjected to a drying treatment for 24 hours at 80° C., and then injection molded using the injection molding machine NN75JS (available from Niigata Engineering Co., Ltd.) at conditions including a mold temperature of 80° C. and a cylinder temperature of 240° C., and an injection-molded plate (flat plate: 100×100 mm, thickness: 1 mm) made of the cellulose nanocrystal-containing resin composition was obtained.

The TVOC amount of the injection-molded plate made from the aforementioned cellulose nanocrystal-containing resin composition was determined in the same manner as in Example 2.

Comparative Example 5

A polypropylene resin (MA04, available from Japanese Polypropylene Corporation) was melt-kneaded using a twin screw granulator equipped extruder (TEM-35B: available from Toshiba Machine Co., Ltd.) having a barrel temperature setting of 200° C., and microcrystalline cellulose having a hemicellulose content of 17.8 wt. % was quantitatively charged into the melt-kneaded polypropylene resin such that the blending ratio of the microcrystalline cellulose to the polypropylene resin became 4 wt. %, and the mixture was melt-kneaded at a rotational speed of 100 rpm, and thereby a microcrystalline cellulose-containing resin was obtained. The microcrystalline cellulose-containing resin was heated and subjected to a drying treatment for 5 hours at 80° C., and then injection molded using the injection molding machine NN75JS (available from Niigata Engineering Co., Ltd.) at conditions including a mold temperature of 20° C. and a cylinder temperature of 200° C., and an injection-molded plate (flat plate: 100×100 mm, thickness: 1 mm) made of the microcrystalline cellulose-containing resin composition was obtained.

The TVOC amount of the injection-molded plate made from the aforementioned microcrystalline cellulose-containing resin composition was determined in the same manner as in Example 1.

Comparative Example 6

A nylon 6 resin (A1020BRL available from Unitika Ltd.) was melt-kneaded using a twin screw granulator equipped extruder (TEM-35B: available from Toshiba Machine Co., Ltd.) having a barrel temperature setting of 240° C., and microcrystalline cellulose having a hemicellulose content of 17.8 wt. % was quantitatively charged into the melt-kneaded nylon 6 resin such that the blending ratio of the microcrystalline cellulose to the nylon 6 resin became 10 wt. %, and the mixture was melt-kneaded at a rotational speed of 100 rpm, and thereby a microcrystalline cellulose-containing resin was obtained. The microcrystalline cellulose-containing resin was heated and subjected to a drying treatment for 24 hours at 80° C., and then injection molded using the injection molding machine NN75JS (available from Niigata Engineering Co., Ltd.) at conditions including a mold temperature of 80° C. and a cylinder temperature of 240° C., and an injection-molded plate (flat plate: 100×100 mm, thickness: 1 mm) made of the microcrystalline cellulose-containing resin composition was obtained.

The TVOC amount of the injection-molded plate made from the aforementioned microcrystalline cellulose-containing resin composition was determined in the same manner as in Example 2.

TABLE 1

|  |  | Example 1 | Example 2 |
|---|---|---|---|
| Base resin | Type | Polypropylene | Nylon 6 |
| Inclusions | Type | Cellulose nanocrystals | Cellulose nanocrystals |
|  | Amount (mmol/g) of a sulfate group and/or a sulfo group | 0.1 | 0.1 |
|  | Mixing Concentration (wt. %)*1 | 4 | 10 |
|  | Hemicellulose amount (wt. %)*2 | 10 | 10 |
| Resin composition | TVOC amount (μg/m$^3$) | 3783 | 193 |

*1 wt. % relative to base resin
*2 wt. % relative to cellulose nanocrystals or microcrystalline cellulose

TABLE 2

|  |  | Comparative Example 1 | Comparative Example 2 |
|---|---|---|---|
| Base resin | Type | Polypropylene | Nylon 6 |
| Inclusions | Type | None | None |
|  | Amount (mmol/g) of a sulfate group and/or a sulfo group | — | — |
|  | Mixing Concentration (wt. %)*1 | — | — |
|  | Hemicellulose amount (wt. %)*2 | — | — |
| Resin composition | TVOC amount (μg/m$^3$) | 4122 | 412 |

*1 wt. % relative to base resin
*2 wt. % relative to cellulose nanocrystals or microcrystalline cellulose

TABLE 3

|  |  | Comparative Example 3 | Comparative Example 4 |
|---|---|---|---|
| Base resin | Type | Polypropylene | Nylon 6 |
| Inclusions | Type | Cellulose nanocrystals | Cellulose nanocrystals |
|  | Amount (mmol/g) of a sulfate group and/or a sulfo group | 0.1 | 0.1 |
|  | Mixing Concentration (wt. %)*1 | 4 | 10 |
|  | Hemicellulose amount (wt. %)*2 | 18.3 | 18.3 |
| Resin composition | TVOC amount (μg/m$^3$) | 13064 | 487 |

*1 wt. % relative to base resin
*2 wt. % relative to cellulose nanocrystals or microcrystalline cellulose

TABLE 4

|  |  | Comparative Example 3 | Comparative Example 4 |
|---|---|---|---|
| Base resin | Type | Polypropylene | Nylon 6 |
| Inclusions | Type | Microcrystalline cellulose | Microcrystalline cellulose |
|  | Amount (mmol/g) of a sulfate group and/or a sulfo group | — | — |
|  | Mixing Concentration (wt. %)*[1] | 4 | 10 |
|  | Hemicellulose amount (wt. %)*[2] | 17.8 | 17.8 |
| Resin composition | TVOC amount (μg/m$^3$) | 13440 | 709 |

*[1]wt. % relative to base resin
*[2]wt. % relative to cellulose nanocrystals or microcrystalline cellulose

INDUSTRIAL APPLICABILITY

TVOCs are reduced more in the cellulose nanocrystal-containing resin composition of the present invention than in the resin alone, and the cellulose nanocrystal-containing resin composition of the present invention can be suitably used in applications such as automotive interior materials and building materials.

The invention claimed is:

1. A cellulose nanocrystal-containing resin composition comprising a resin, the resin containing a cellulose nanocrystal having a hemicellulose content of 10 wt. % or less, wherein the cellulose nanocrystal contains a sulfate group and/or a sulfo group originated from a sulfuric acid treatment in an amount from 0.01 to 0.2 mmol/g.

2. The cellulose nanocrystal-containing resin composition according to claim 1, wherein an amount of total volatile organic components (measured in accordance with JASO M 902:2011) is smaller than an amount of total volatile organic components in the resin alone.

3. The cellulose nanocrystal-containing resin composition according to claim 1, wherein the cellulose nanocrystal has a fiber width of 50 nm or smaller, a fiber length of 500 nm or smaller, and a crystallinity of 60% or greater.

4. The cellulose nanocrystal-containing resin composition according to claim 1, wherein the cellulose nanocrystal-containing resin composition contains the cellulose nanocrystal in an amount from 0.1 to 50 parts by weight relative to 100 parts by weight of the resin.

5. The cellulose nanocrystal-containing resin composition according to claim 1, wherein the resin is a thermoplastic resin.

6. A method of producing a cellulose nanocrystal-containing resin composition, the method comprising adding a cellulose nanocrystal to a resin, and mixing the resin with the cellulose nanocrystal, wherein the cellulose nanocrystal:
(a) has a hemicellulose content of 10 wt. % or less, and
(b) contains a sulfate group and/or a sulfo group originated from a sulfuric acid treatment in an amount from 0.01 to 0.2 mmol/g.

* * * * *